United States Patent [19]
Fitzpatrick et al.

[11] Patent Number: 5,819,011
[45] Date of Patent: Oct. 6, 1998

[54] MEDIA BOUNDARY TRAVERSAL METHOD AND APPARATUS

[75] Inventors: Gregory P. Fitzpatrick, Fort Worth; William J. Johnson, Flower Mound; Marvin L. Williams, Lewisville, all of Tex.

[73] Assignee: International Business Machines Corporation, Armonk, N.Y.

[21] Appl. No.: 736,876

[22] Filed: Oct. 25, 1996

Related U.S. Application Data

[63] Continuation of Ser. No. 998,345, Dec. 30, 1992, abandoned.

[51] Int. Cl.$^6$ .................................................. G06F 15/00
[52] U.S. Cl. ........................................... 395/110; 395/117
[58] Field of Search ..................................... 395/110, 118, 395/101, 102, 114, 117, 340, 111, 342, 348

[56] References Cited

U.S. PATENT DOCUMENTS

| | | | |
|---|---|---|---|
| 4,971,461 | 11/1990 | Kato et al. | 400/70 |
| 5,007,002 | 4/1991 | Imaizumi et al. | 364/519 |
| 5,040,129 | 8/1991 | Nishiyama | 369/519 |
| 5,051,925 | 9/1991 | Kadono et al. | 364/519 |
| 5,093,903 | 3/1992 | Sudoh et al. | 395/102 |
| 5,171,093 | 12/1992 | Iwamoto et al. | 400/121 |
| 5,233,683 | 8/1993 | Sasaki | 395/110 |
| 5,257,074 | 10/1993 | Kamei | 355/244 |
| 5,313,565 | 5/1994 | Mori | 395/118 |
| 5,314,256 | 5/1994 | Niwa | 400/61 |

OTHER PUBLICATIONS

"Wordperfect for DOS—Reference, Ver. 5.1, pp. 85–92, 1989".

E. A. Green, H. H. Nguyen, R. P. Pekowski and O. Perez "Code Page Specification for Both Source and Destination File" Research Disclosure, No. 319, published Nov., 1990.

G. M. Dolan, V. Leith and R. W. Willis "Programmable Telecommunications Data Filter" published Feb., 1991.

M. L. Williams "Conveying Conversion–With–Loss Prohibition" IBM Technical Disclosure Bulletin, vol. 33, No. 3A, p. 261, published Aug., 1990.

R. J. Bolan, J. R. Carlock, J. S. Czyszczewski, E. M. Duttlinger, P. T. Go, R. L. Hinkle and J. A. O'Keefe "Method for Implementing Bidirectional Datastream Transforms" IBM Technical Disclosure Bulletin, vol. 32, No. 12, pp. 338–341, published May, 1990.

H. H. Nguyen and R. P. Pekowski "Assignment Scheme for Round Trip Integrity" IBM Technical Disclosure Bulletin, vol. 30, No. 10, pp. 93–95, published Mar., 1988.

(List continued on next page.)

*Primary Examiner*—Raymond J. Bayerl
*Assistant Examiner*—Steven P. Sax
*Attorney, Agent, or Firm*—Norman L. Gundel

[57] ABSTRACT

A method and data processing system are disclosed for media boundary traversal. In one embodiment, the invention transforms an electronic data processing file to a printed output that is understandable to humans and then transforms the printed output back to an electronic data processing file without loss of nonprintable characters. The embodiment gets an input file including both printable characters and nonprintable characters; writes the printable characters to an output file; determines locations among the printable characters of the nonprintable characters; transforms the nonprintable characters to printable character sequences; writes the printable character sequences and the locations of the nonprintable characters to an output file separately from the printable characters; and prints the output file. The printable characters of the input file remain understandable by humans in the printed output. The embodiment also comprehends scanning the printed output and performing optical character recognition; transforming the printable character sequences back to nonprintable characters and inserting the nonprintable characters among the printable characters at the written locations; thereby recreating the original input file.

9 Claims, 3 Drawing Sheets

OTHER PUBLICATIONS

J. R. Pienta "Method to Preserve Unrecognized Controls in Text Portion of a Document" IBM Technical Disclosure Bulletin, vol. 29, No. 7, pp. 3144–3145, published Dec., 1986.

M. L. Gentry, A. W. Heath, V. M. Hoffman and T. F. Peebles "Character Set Change Minimization When Alternate Character Is From A Proper Subset Of The Home Keyboard Character Set" IBM Technical Disclosure Bulletin, vol. 28, No. 9, pp. 4070–4071, published Feb., 1986.

G. M. Bartlett "Conversion of Text Formatting Parameters" IBM Technical Disclosure Bulletin, vol. 27, No. 1A, pp. 134–135, published Jun., 1984.

P. W. Agnew, J. J. Erhard, A. M. Gruhn and A. S. Kellerman "Preservation of Data Stream Controls Without Impact On Another Data Stream's Integrity" IBM Technical Disclosure Bulletin, vol. 26, No. 6, pp. 2719–2720, published Nov., 1983.

J. L. Gaudet, H. L. Lineman and G. H. Neuman "Universal Print Level Data Stream" IBM Technical Disclosure Bulletin, vol. 26, No. 3B, pp. 1431–1432, published Aug., 1983.

J. R. Featherston "Digital Encoding of Wide Range Dynamic Analog Signals" IBM Technical Disclosure Bulletin, pp. 2415–2417, published Nov., 1977.

Simpson, *Mastering WordPerfect 5.1 for Windows*, SYBEX Inc., Alameda, Ca. 1991.

Williams, "Conveying Conversion with Loss Prohibition," *IBM Technical Disclosure Bulletin*, vol. 33, No. 3A, p. 261, Aug. 1990.

Dolan, et al., "Method for Implementing Bidirectional Datastream Transforms," *IBM Technical Disclosure Bulletin*, vol. 32, No. 12, May. 1990.

Nguyen et al., "Assignment Scheme for Round Trip Integrity," *IBM Technical Disclosure Bulletin*, vol. 30, No. 12, Mar. 1988.

Barlett, "Conversion of Text Formatting Parameters," *IBM Technical Disclosure Bulletin*, vol. 27, No. 1A, Jun. 1984.

MEDIA BOUNDARY TRAVERSAL METHOD AND APPARATUS

This application is a continuation of commonly owned application Ser. No. 07/998,345, filed Dec. 30, 1992 and now abandoned.

BACKGROUND OF THE INVENTION

1. Field of the Invention

The present invention relates to the translation of data streams across differing media and in particular to the loss-less translation of electronic data processing streams to and from graphical or printed media.

2. Description of the Related Art

Data streams used by electronic data processing systems may be translated across differing media. Difficulties may arise when an intermediate media or the target media is capable of fewer characters than the source media. Translation algorithms have been applied to convert an electronic data processing system file or data stream composed of eight bit characters into a seven bit transfer format that is useful when transferring documents over a modem or line that only transfers seven bits. A receiver of this seven bit format file may then convert it back to an eight bit format.

Translation or conversion of electronic data processing files to and from graphical or printed media presents particular problems. Graphical media such as facsimile and printed media such as books and magazines may be used to distribute data streams such as program and data files. Graphical and printed media have several advantages: they are commonly available, they are inexpensive, they can be transmitted long distances by common facsimile devices, they can be included in books or magazines and the graphical or printed characters used can be converted to an electronic data stream by a data processing system equipped with a scanner. Graphical and printed media also have the advantage that their contents can be read and understood by the unaided human eye.

However, many nonprintable characters found in electronic data processing data streams, such as nonprintable ASCII characters or word processing formatting codes, may not be displayable or printable in graphical or printed media. Other characters, such as spaces or tabs may not be accurately reconstructible from a graphical or printed output. Thus, the displaying or printing of an electronic data processing data stream often involves a loss of data that cannot be recovered by translation from the graphical or printed media back into an electronic data processing format.

To prevent data loss, the printable and nonprintable characters of an electronic data processing system data stream may be translated into printable characters, such as two digit hexadecimal representations of eight bit ASCII. Such translations have been printed in magazines and may be keyed or scanned into an electronic data processing system by a person called a user. However, this method sacrifices a significant and potential advantage of the use of graphical or printed media, the human reader's ability to read and understand displayable or printable information content of the file with his unaided eye.

Alternatively, a data stream such as a word processing document file may be displayed or printed. The displayable or printable characters of the data stream are thus preserved in a form that is understandable by a human reader. The graphical or printed output may subsequently be scanned into a data processing system, using optical character recognition, and processed to create formatting information from the positions of the displayable or printable characters. However, even an accurate processing algorithm is no guarantee of the integrity of the nondisplayable or nonprintable information of the original file; often a mere approximation is all that is achievable.

Thus, there is a need for a method and apparatus for translating or converting electronic data processing data streams and files to and from graphical or printed media while preserving both the legibility of the graphical or printed output to the unaided human eye and also the integrity of the underlying data.

SUMMARY OF THE INVENTION

In accordance with the present invention, a method and data processing system are disclosed for media boundary traversal. In one embodiment, the invention transforms an electronic data processing file to a printed output that is understandable to humans and then transforms the printed output back to an electronic data processing file without loss of nonprintable characters. The embodiment gets an input file including both printable characters and nonprintable characters; writes the printable characters to an output file; determines locations among the printable characters of the nonprintable characters; transforms the nonprintable characters to printable character sequences; writes the printable character sequences and the locations of the nonprintable characters to an output file separately from the printable characters; and prints the output file. The printable characters of the input file remain understandable by humans in the printed output. The embodiment also comprehends scanning the printed output and performing optical character recognition; transforming the printable character sequences back to nonprintable characters and inserting the nonprintable characters among the printable characters at the written locations; thereby recreating the original input file.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
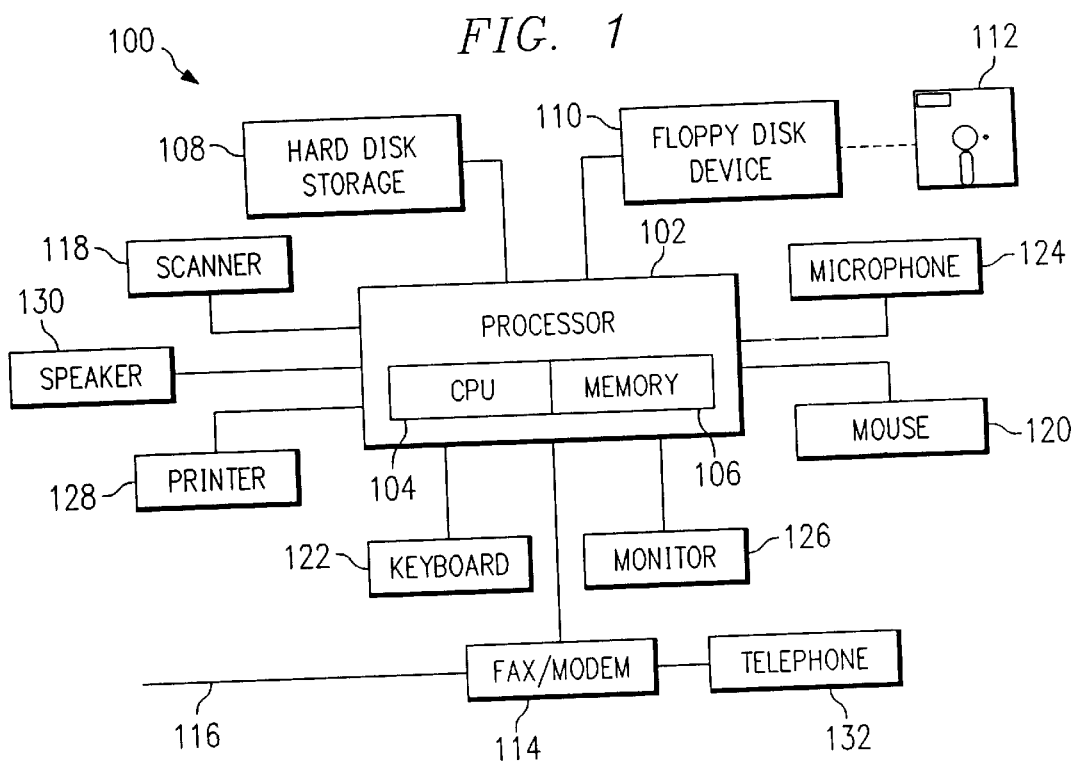
FIG. 1 is a block diagram of an apparatus used in performing the method of a preferred embodiment of the present invention and forming a part of the apparatus of a preferred embodiment of the present invention.

With reference now to the Figures, and in particular with reference to FIG. 1, there is shown, in block diagram form, an apparatus according to the present invention. The apparatus includes a data processing system 100. The data processing system 100 includes a processor 102, which includes a central processing unit (CPU) 104 and memory 106. Additional memory, such as a hard disk file storage 108 and a floppy disk device 110 may be connected to the processor 102. Floppy disk device 110 may write to or read from a removable diskette 112 which may have computer program code recorded thereon that implements portions of the present invention in the data processing system 100. Inputs may also be received from a fax/modem 114, which is connected to a telephone line 116, and from a scanner 118. The data processing system 100 also includes user interface hardware, such as a mouse 120, a keyboard 122 and a microphone 124, for allowing user input to the processor 102. The data processing system 100 also includes visual display devices, such as a monochrome or color display monitor 126 and a monochrome or color display printer 128, for rendering visual information. The data processing system may also include an audio display device, such as a speaker 130 for rendering audio information. A telephone 132 may be connected to the telephone line 116 through the fax/modem 114.

Figure 2:
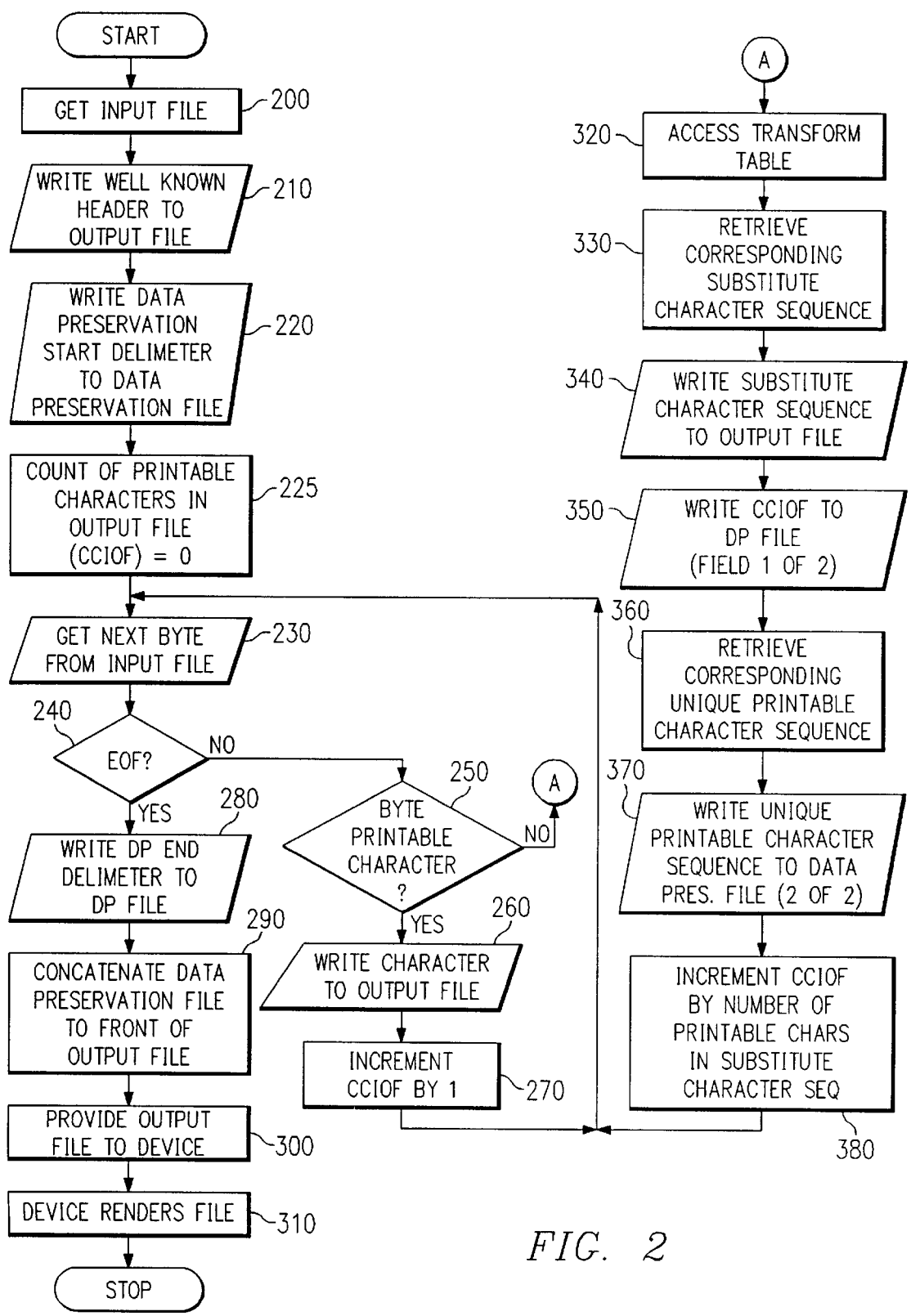
FIG. 2 is a high level logic flowchart illustrating the method of translating or converting an electronic data processing data stream or file to a graphical or printed media.

With reference now to FIG. 2, there is depicted a high level logic flowchart which illustrates the method of a preferred embodiment of the present invention for translating or converting an electronic data processing system data stream or file to a graphical or printed media. The process begins at block 200 by getting the input file to be converted. The process then proceeds to block 210 and writes a well known header to an output file. The presence of this header will identify the graphical or printed output as convertible to an electronic data processing data stream or file without loss. The process then proceeds to block 220 and writes a data preservation start delimiter to a data preservation file. The process then proceeds to block 225 and defines the variable, Count of printable Characters In Output File (CCIOF), equal to zero. The variable CCIOF will be used to provide an offset, which is a location, within the original input data stream or file, of each nonprintable or nondisplayable character. The process then proceeds to block 230 and gets the next or first byte from the input file. The process then proceeds to block 240 and checks whether this next or first byte is an end-of-file delimiter. If yes, the process proceeds from block 240 to block 280.

Returning to block 240, if the next or first byte retrieved from the input file is not an end-of-file delimiter, the process proceeds from block 240 to block 250 for a determination of whether the retrieved byte is a printable or displayable character. Preferably, a printable or displayable character is one that may be easily distinguished on a printed page by, for example, a scanner, such as a character that causes ink to be applied to a page. Thus, input file characters such as a space, a tab, a carriage return or a line feed, which may in other applications may be considered printable or displayable characters, may in the present invention be considered nonprintable characters. If it is determined in block 250 that the byte is a printable or displayable character, the process proceeds from block 250 to block 260 and writes the character to the output file. The process then proceeds to block 270 and increments the variable CCIOF by one. The process then returns to block 230, as described above.

Returning to block 250, if it is determined that the byte is not a printable or displayable character, the process proceeds to block 320 and accesses the transform table. The same transform table is used by various data processing systems embodying the present invention. The transform table includes a record for each nonprintable character. Each record has three fields. One field contains the nonprintable character. A second field contains a unique sequence of printable characters that is associated with the nonprintable character. Preferably, all of the unique printable character sequences include the same number of printable characters, for example, two printable characters.

The third field of the transform table may, but is not required to, include an output file substitute character sequence. This substitute character sequence may include either printable characters or nonprintable characters or both. Substitute character sequences may vary in length. The purpose of the substitute character sequence is to approximate the formatting of the original input document after nonprintable formatting codes have been removed. Thus, a nonprintable tab character may have a substitute character sequence of five spaces. A registered trademark circle-R symbol, which may be a nonprintable character to a daisy wheel printer, may have an asterisk or a space as a substitute character sequence. Substitute character sequences need not be unique—a registered copyright circle-C symbol may have the same substitute character sequence as the registered trademark circle-R symbol.

The process then proceeds from block 330 to block 340 and writes to the output file the substitute character sequence for the retrieved nonprintable character. The process then proceeds to block 350 and writes the current value of the variable CCIOF to the data preservation file as the first field of a record having two fields. The process then proceeds to block 360 and retrieves from the transform table the unique printable character sequence there associated with the nonprintable character. The process then proceeds to block 370 and writes the unique printable character sequence to the data preservation file as the second field of the two field record.

The process then proceeds to block 380 and increments the variable CCIOF. Preferably the variable is incremented by the number of printable characters in the substitute character sequence. Alternatively, the variable CCIOF may be incremented by the total number of characters in the substitute character sequence.

The process then proceeds from block 380 to block 230 as described above and retrieves the next byte from the input file, as described above.

Returning now to block 240, if, after retrieving the next byte from the input file in block 230, it is determined in block 240 that the retrieved byte is an end-of-file delimiter, the process proceeds from block 240 to block 280. In block 280, the process writes a data preservation end delimiter to the data preservation file. The process then proceeds to block 290 and concatenates the data preservation file to the front of the output file. The process then provides the output file to an output device, such as a printer or fax.

The process then proceeds from block 300 to block 310 in which the output device renders the file, for example as printed or fax output. The process then terminates.

Figure 3:
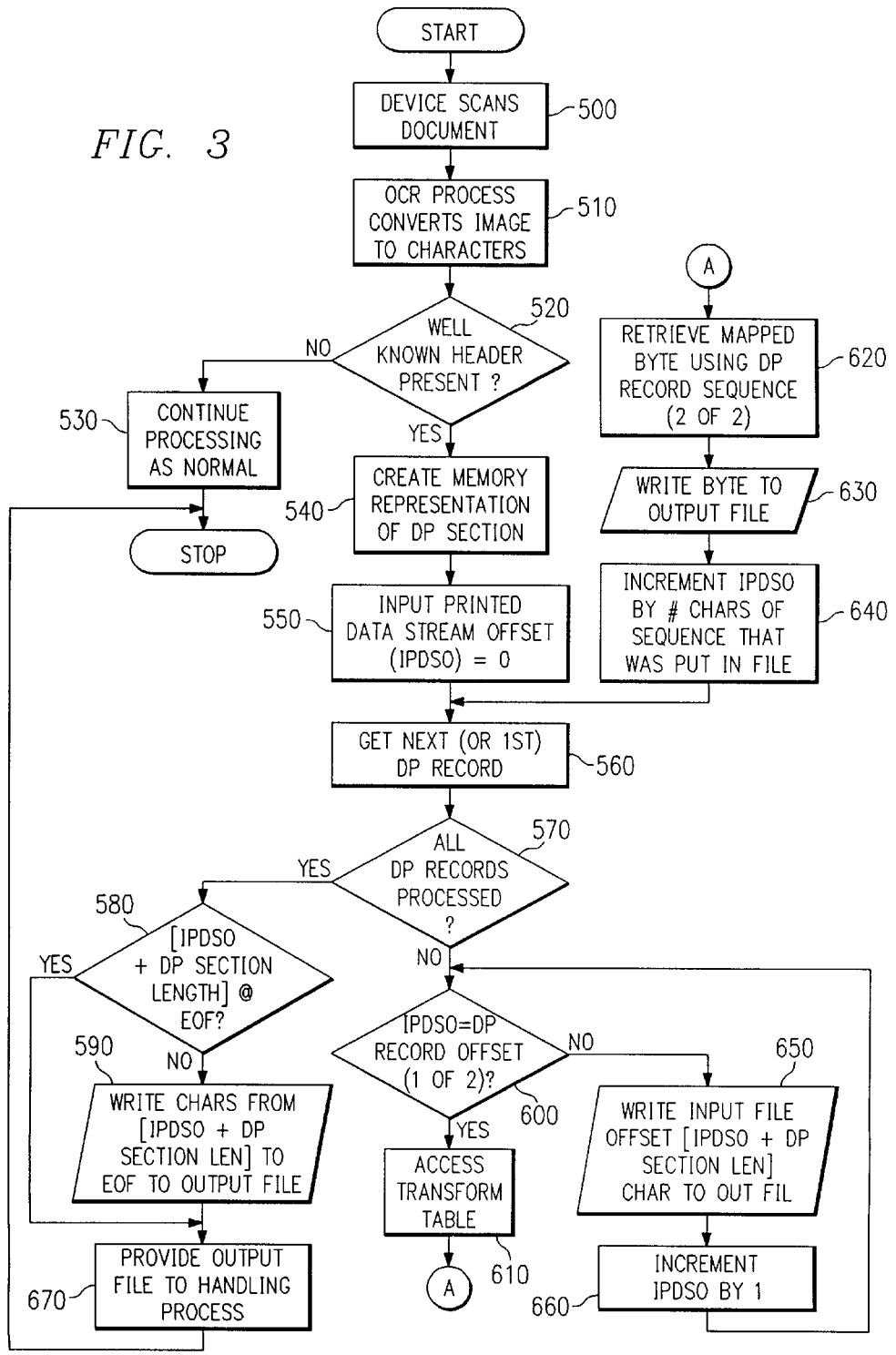
FIG. 3 is a high level logic flowchart illustrating the method of translating or converting the graphical or printed media embodiment of the electronic data processing data stream or file back to an electronic data processing data stream or file.

With reference now to FIG. 3, there is depicted a high level logic flowchart which illustrates the method of a preferred embodiment of the process for transforming or converting characters of a graphical or printed media to an electronic data processing data stream or file. The process begins at block 500 by receiving a facsimile transmission, scanning a printed document or otherwise receiving a graphical character representation. The process then proceeds to block 510 and uses an optical character recognition process to convert the image to characters. Preferably, the optical character recognition process is configured so that its output contains only displayable or printable characters. The process then proceeds from block 510 to block 520 for a determination of whether the characters begin with the well known header that identifies graphical or printed output created by the process of the present invention. If no, the process proceeds to block 530 and processes the characters as normal. The process then terminates.

Returning to block 520, if the process detects the presence of the well known header that identifies a graphical or printed output created by the present invention, the process proceeds from block 520 to block 540 and creates a memory representation of the data preservation section that comprises the initial portion of the received characters. This constitutes the data preservation file that was concatenated to the front of the output file in block 290 of FIG. 2. It is bounded by the data preservation start delimiter written in block 220 and the data preservation end delimiter written in block 280 of FIG. 2.

The process then proceeds from block 540 to block 550 and defines a variable, Input Printed Data Stream Offset (IPDSO), equal to zero. The process then proceeds from block 550 to block 560 and gets the next, or the first, data processing record from the data preservation section. As will be recalled, each data preservation record has two fields, written in blocks 350 and 370, respectively, of FIG. 2. As will be recalled, the first field of each record is the value of the variable CCIOF at the location of a nonprintable character. The second field is the unique printable character sequence associated with the nonprintable character.

The process next proceeds from block 560 to block 570 for a determination of whether the next data preservation record is the data preservation end delimiter written in block 280, that is, whether all data preservation records have now been processed. If not, the process proceeds from block 570 to block 600.

In block 600, the process determines whether the variable IPDSO is equal to the first field of the data preservation record, which is the data preservation record offset written in block 350 of FIG. 2. If no, the process proceeds from block 600 to block 650, as the process has not yet reached the point in its output file where the next nonprintable character is to be inserted. In block 650, the process writes to the output file the scanned input character at the character count defined as the value of the variable IPDSO plus the length of the data preservation section. The process then proceeds from block 650 to block 660 and increments the variable IPDSO by one. The process then returns to block 600.

In block 600, if it is determined that the variable IPDSO is equal to the value of the first field, the data preservation record offset of the current data preservation record, the process proceeds from block 600 to block 610. This determination signifies that the next character to be inserted in the output file is one of the nonprintable characters processed by blocks 320 through 380 of FIG. 2.

In block 610, the process accesses the transform table. The process then proceeds to block 620 and uses the second field of the current data processing record, the unique printable character sequence written in block 360 of FIG. 2, to retrieve from the transform table the mapped byte representing the nonprintable character. The process then proceeds from block 620 to block 630 and writes the retrieved nonprintable character to the output file. The process then proceeds from block 630 to block 640 and determines the number of printable characters in the substitute character sequence of the transform table and increments the variable IPDSO by the number of such characters. The process then proceeds from block 640 to block 560, described above, to get the next data preservation record.

Returning to block 570, if it is determined that all data preservation records have been processed, as described above, the process proceeds from block 570 to block 580. In block 580, it is determined whether the character at the location which is the sum of the value of the variable IPDSO and the data preservation section length is an end-of-file delimiter. If yes, the process proceeds to block 670. If no, the process proceeds from block 580 to block 590 and writes to the output file the remaining characters from the location IPDSO plus data preservation section length to the end of the file. The process then proceeds to block 670. In block 670, the process provides the output file to the data processing system and terminates.

Upon reference to the foregoing, it will be appreciated that the applicants have provided a novel and useful media boundary traversal method and apparatus. While the invention has been particularly shown and described with reference to a preferred embodiment and process, it will be understood that various changes in form and detail may be made therein without departing from the spirit and scope of the invention.

What is claimed is:

1. A method, performed in a data processing system, for transforming, to a printed output, an input data file in which multiple individual nonprintable characters each has its own unique offset to its own unique location in the input data file, the method comprising the computer implemented steps of:

getting an input file that includes multiple commingled individual nonprintable characters and human comprehendible printable characters;

transforming an individual nonprintable character of the input file to an individual printable character sequence and printing said individual printable character sequence to a printed output;

determining an individual offset within the input file of said individual nonprintable character and printing said individual offset to the printed output in association with said individual printable character sequence;

repeating the steps of transforming and printing and of determining and printing for other individual nonprintable characters of the input file;

printing the human comprehendible printable characters of the input file to the printed output separately within the printed output from the printed individual printable character sequences and the associated printed individual offsets so that the human comprehendible printable characters printed to the printed output are not commingled with the printed individual printable character sequences and the associated printed individual offsets printed to the printed output;

whereby both the human comprehendible printable characters of the input file and the printed individual printable character sequences and the associated printed individual offsets corresponding to the nonprintable characters of the input file are printed to the printed output and the printed individual printable character sequences and the associated Printed individual offsets corresponding to the nonprintable characters of the input file printed to the printed output do not interfere with human comprehension of the human comprehendible printable characters of the input file printed to the printed output.

2. The method of claim 1, further comprising the computer implemented steps of:

transforming an individual printable character sequence of the printed output to an individual nonprintable character; and recreating the input file.

3. The method of claim 1, further comprising the computer implemented steps of:

transforming an individual printable character sequence of the printed output to an individual nonprintable character; and inserting the individual nonprintable character into a file at a location determined by the individual offset associated in the printed output with the individual printable character sequence.

4. A data processing system, for transforming, to a printed output, an input data file in which multiple individual nonprintable characters each has its own unique offset to its own unique location in the input data file, comprising:

means for getting an input file that includes multiple commingled individual nonprintable characters and human comprehendible printable characters;

means for transforming an individual nonprintable character of the input file to an individual printable character sequence and printing said individual printable character sequence to a printed output;

means for determining an individual offset within the input file of said individual nonprintable character and printing said individual offset to the printed output in association with said individual printable character sequence;

means for repeating the transformation and printing and the determination and printing of other individual nonprintable characters of the input file;

means for printing the human comprehendible printable characters of the input file to the printed output separately within the printed output from the printed individual printable character sequences and the associated printed individual offsets so that the human comprehendible printable characters printed to the printed output are not commingled with the printed individual printable character sequences and the associated printed individual offsets printed to the printed output;

whereby both the human comprehendible printable characters of the input file and the printed individual printable character sequences and the associated printed individual offsets corresponding to the nonprintable characters of the input file are printed to the printed output and the printed individual printable character sequences and the associated printed individual offsets corresponding to the nonprintable characters of the input file printed to the printed output do not interfere with human comprehension of the human comprehendible printable characters of the input file printed to the printed output.

5. The data processing system of claim 4, further comprising:

means for transforming an individual printable character sequence of the printed output to an individual nonprintable character; and means for recreating the input file.

6. The data processing system of claim 4, further comprising:

means for transforming an individual printable character sequence of the printed output to an individual nonprintable character; and means for inserting the individual nonprintable character into a file at a location determined by the individual offset associated in the printed output with the individual printable character sequence.

7. A computer program product, for use in a data processing system, for transforming, to a printed output, an input data file in which multiple individual nonprintable characters each has its own unique offset to its own unique location in the input data file, the computer program product comprising computer usable medium having computer readable program code embodied in said medium, said computer program product including:

computer readable program code means for getting an input file that includes multiple commingled individual nonprintable characters and human comprehendible printable characters;

computer readable program code means for transforming an individual nonprintable character of the input file to an individual printable character sequence and printing said individual printable character sequence to a printed output;

computer readable program code means for determining an individual offset within the input file of said individual nonprintable character and printing said individual offset to the printed output in association with said individual printable character sequence;

computer readable program code means for repeating the transformation and printing and the determination and printing of other individual nonprintable characters of the input file;

computer readable program code means for printing the human comprehendible printable characters of the input tile to the printed output separately within the printed output from the printed individual printable character sequences and the associated printed individual offsets so that the human comprehendible printable characters printed to the printed output are not commingled with the printed individual printable character sequences and the associated printed individual offsets printed to the printed output;

whereby both the human comprehendible printable characters of the input file and the printed individual printable character sequences and the associated printed individual offsets corresponding to the nonprintable characters of the input file are printed to the printed output and the printed individual printable character sequences and the associated printed individual offsets corresponding to the nonprintable characters of the input file printed to the printed output do not interfere with human comprehension of the human comprehendible printable characters of the input file printed to the printed output.

8. The computer program product of claim 7, further comprising:

computer readable program code means for transforming an individual printable character sequence of the printed output to an individual nonprintable character; and computer readable program code means for recreating the input file.

9. The computer program product of claim 7, further comprising:

computer readable program code means for transforming an individual printable character sequence of the printed output to an individual nonprintable character; and computer readable program code means for inserting the individual nonprintable character into a file at a location determined by the individual offset associated in the printed output with the individual printable character sequence.

\* \* \* \* \*